United States Patent [19]
Kaufmann

[11] Patent Number: 6,113,677
[45] Date of Patent: Sep. 5, 2000

[54] COLORING AGENT

[76] Inventor: Rainer Kaufmann, Schanzenstrasse 36, D-27753 Delmenhorst, Germany

[21] Appl. No.: 09/142,256

[22] PCT Filed: Mar. 18, 1997

[86] PCT No.: PCT/EP97/01357

§ 371 Date: Nov. 17, 1998

§ 102(e) Date: Nov. 17, 1998

[87] PCT Pub. No.: WO97/34957

PCT Pub. Date: Sep. 25, 1997

[30] Foreign Application Priority Data

Mar. 18, 1996 [DE] Germany .......................... 196 10 560

[51] Int. Cl.[7] .................................................... C09D 11/02
[52] U.S. Cl. .................................... 106/31.27; 106/31.43; 106/31.58
[58] Field of Search .............. 106/31.27, 31.43, 106/31.58

[56] References Cited

U.S. PATENT DOCUMENTS 5,462,592   10/1995   Murakami et al. .................. 106/31.59
5,518,534   5/1996   Pearlstine et al. ..................... 106/31.6

FOREIGN PATENT DOCUMENTS 5-148437   6/1993   Japan .
5-339532   12/1993   Japan .

OTHER PUBLICATIONS

Derwent abstract of JP05/148437, Jun. 1993.

*Primary Examiner*—Helene Klemanski
*Attorney, Agent, or Firm*—Oblon, Spivak, McClelland, Maier & Neustadt, P.C.

[57] ABSTRACT

The invention concerns a coloring agent which contains water, one or a plurality of water-soluble dye(s) having anionic groups which exhibit a $pK_a$ value substantially not exceeding A, in combination with a precursor of a first auxiliary substance wherein the first auxiliary substance as such has a $pK_a$ value of C wherein C may be larger or smaller than A or may be equal to A. The invention also relates to a printing process or writing process, respectively, wherein such a coloring agent is used.

24 Claims, No Drawings

COLORING AGENT

The present invention relates to a colouring agent, particularly to an ink or to a printing ink. Moreover, the invention relates to a printing process or writing process with the application of a colouring agent, particularly with the application of an ink or printing ink, onto a material or support, respectively, by means of a per se known printing device or writing device. The invention finally also relates to a process for manufacturing a colouring agent.

Colouring agents, in particular inks or printing inks, are known since a long time. Already at times when colouring agents still were manually applied to suitable media like parchment, paper etc., but also in recent times, when the application of colouring agents was carried out manually or mechanically by means of suitable printing devices, for example by means of ink jet printers, there was a problem in that such inks were not water-resistant after drying on the medium onto which they were applied, in particular in such cases where intensive, water-soluble dyes were used for colouring. Signs applied onto suitable media as paper etc. by means of heretofore known colouring agents, particularly by inks or printing inks, are blurred when coming into contact with humidity, sweat or even with water or aqueous solutions. This is a disadvantage not only for inks applied by means of fountain pens, but also for inks applied, for example, by ink jet printers used in word processing, in modern printing systems etc. The solubility of such colouring agents in water results from the introduction of polar, salt-forming groups into the dye molecule. A good solubility in water usually is obtained, if several polar, salt-forming groups are present in the dye molecule and if the counter-cation of said salt-forming group(s) is a sodium ion.

On the other hand, a good solubility of said colouring agents in water is desired, since the colouring agents are provided for use in the form of aqueous solutions or at least in the form of solutions at least predominantly containing water as the solvent. Numerous colouring molecules, however, are non polar or at least poorly soluble in aqueous media, not considering their polar side groups conferring solubility. It is a frequently occurring consequence when storing or using such inks that the colouring agent(s) precipitate, leaving an aqueous phase which is more or less depleted of the colouring substance. The supernatant above said precipitated solid is unsuitable as a colouring agent. In addition, there is a high risk that the precipitated solid(s) clog(s) the conduits supplying the colouring agent in said writing or printing devices.

It was the object of the invention to provide a colouring agent, in particular an ink or a printing ink which is water-based and does not precipitate from an aqueous solution during storage or use even under unfavorable conditions, which, however, becomes insoluble after drying on a medium or material onto which it is applied in the course of printing or writing.

It was another object of the invention to provide a printing method by which a water-insoluble print can be generated on a suitable medium. It was also an object of the invention to provide a writing method resulting into water-insoluble letters or drawings on a suitable medium.

Finally, it was also an object of the invention to provide an economically acceptable and reproducible process for manufacturing a colouring agent or printing ink, respectively, which method may be conducted under industrially applicable conditions so as to obtain a stable colouring agent or printing ink.

Surprisingly, it was found that the solubility of the colouring agent in water or the re-dissolvability of the colouring agent in water or aqueous solutions can be controlled depending upon the pH value of the aqueous medium. Thereby, a means is provided by which the solubility of the colouring agent can be adapted to the conditions constrained by the soluble dye specifically used.

The colouring agent according to the invention may be an ink as normally used in per se known writing means for manual or mechanical writing. In this connection, typical writing means are, for example, fountain pens, ink ballpoint pens, plotters for drawing systems or printers for data processing systems, machine typing systems etc. The colouring agents, however, may also be a printing ink as conventionally used in a usual printing press. Such inks or printing inks is subsequently referred to as "colouring agent".

The colouring agents according to the invention contain, as essential components, water and one or more water-soluble dye(s) having anionic groups in combination with a precursor of a first auxiliary substance.

Usually, clean, i.e. demineralized, water is used as the water. In specific applications, it is possible, however, to use conventional tap water which usually contains limestone-generating ions in appreciable concentrations.

The colouring agents of the invention contain water preferably in amounts of from 50 to 90 parts by weight, more preferred in amounts of from 60 to 80 parts by weight. The amount of water may vary dependent upon the coloration power of the dye. As will be described below, water as the essential component of the colouring agents according to the invention may be partly replaced by other solvents including organic solvents.

Another component of the colouring agent according to the invention is one or are more than one dye(s) soluble in water. Preferably, a single, water-soluble dye having anionic groups is used. However, this is not compulsory; in order to obtain specific colouring effects, more than one water-soluble dyes having anionic groups may be used in admixture. The anionic groups bound to the dye molecule may preferably be anionic groups neutralized by forming salts. The counter ion may be a hydrogen ion. However, if salts are formed, metal ions are present, particularly metal ions like $Na^+$ ions assuring solubility in water. However, also ammonium ions including ammonium ions having organic groups may be present.

In accordance with the present invention, it is critical that the anionic groups exhibit a $pK_a$ value essentially not exceeding A. In connection with the present invention, the value of "A" is not an absolute value, but is a relative figure connecting the $pK_a$ value of the anionic groups of the dye to the $pK_a$ values of the first auxiliary substance (C) and of the second auxiliary substance (B). It is well known that the $pK_a$ value is a dimension figure for the acidity of acids and is defined as the negative decimal logarithm of the acidity constant $K_a$, i.e. the equilibrium constant of the dissociation reaction

wherein HA is the acid and $A^-$ is the corresponding acid anion.

According to the physico-chemical principles, the value of $K_a$ is the greater (and, hence, the value of $pK_a$ is the smaller), the stronger the corresponding acid HA is.

The colouring agent according to the invention contains, in combination with the water and the water-soluble dye having anionic groups having a $pK_a$ value substantially not exceeding A, the precursor of a first auxiliary substance. The first auxiliary substance is not present in the colouring agent as such, but is present in the form of a precursor which precursor reacts to the first auxiliary substance in the course of a chemical reaction. This first auxiliary substance as such exhibits a $pK_a$ value of C. In accordance with the invention, said value of C is smaller than the value of A. In other words: the first auxiliary substance is a stronger acid than the water-soluble dye having anionic groups.

The $pK_a$ value of "C", too, is not so important in relation to the absolute value of its figure, but is important in relation to its relative value compared to the $pK_a$ value of the water-soluble dye having anionic groups.

It is a preferred embodiment of the invention that the colouring agent additionally contains a second auxiliary substance having a $pK_a$ value of B, which is dissolved in the water. According to the invention, the relation B>A>C is applicable. In other words: the second auxiliary substance dissolved in the water is, in accordance with the invention in one of its preferred embodiments, a less strong acid than the water-soluble dye having anionic salt-forming groups. Also in relation to the $pK_a$ value of B, the absolute figure is less important than the fact that the value of B is larger than the value of A and larger than the value of C. There may be present a plurality of second auxiliary substances, too.

From a practical point of view, it is particularly approved that the anionic groups bound to the water-soluble dye are sulfonic acid groups or carbonic acid groups. Such groups do not only provide a $pK_a$ value being inbetween the $pK_a$ values of the first auxiliary substance and of the second auxiliary substance but, in addition, have the advantage that a great number of such dyes are already known, are well defined with respect to the colour spectrum as well as with respect to the $pK_a$ value and correspond to the above definition.

Dyes which may be used in accordance with the invention may stem from different classes of organic dyes which are known as such and are used also in colouring writing and print media like paper. Examples are acidic dyes (acid dyes like acid red . . . or acid black . . . ) direct dyes (direct dyes like direct blue . . . or direct yellow . . . ) or reactive dyes (reactive dyes like reactive red . . . or reactive green . . . ), the above selection not at all limiting the invention.

Particularly preferred water-soluble dyes having anionic salt-forming groups are selected from the group consisting of nitro dyes, monoazo dyes, diazo dyes, triazo dyes, polyazo dyes, stilbene dyes, carotinoid dyes, diphenylmethane dyes, triarylmethane dyes, xanthene dyes, acridine dyes, quinoline dyes, methine dyes and polymethine dyes, thiazol dyes, indamine dyes, indophenol dyes, azine dyes, oxazine dyes, thiazine dyes, sulphur dyes, lactone dyes, aminoketone dyes, hydroxyketone dyes, anthraquinone dyes, indigoid dyes, phthalocyanine dyes or natural dyes. Such dyes are known in a great number for use in colouring agents and comprise all hues of the colour index list (Colour Index of Society of Dyers and Colourists, Charles Worth & Co., Ltd., Huddersfield) so that the specific selection of the dye may be adapted to the specific requirements and can, hence, be left to the skill of persons being familiar with this field of the art. Particularly suitable as the dyes are, for example, phthalocyanine dyes (for example C.I. Direct Blue 199), triazo dyes or tetraazo dyes (for example C.I. Direct Red 80), nigrosine dyes (for example C.I. Acid Black 2), eosin dyes (for example C.I. Acid Red 87).

In accordance with the invention, there are proved, and are preferably used, the dyes of the following table 1 without limiting the invention to these dyes:

TABLE 1

| No. | | Denomination of the Dye | Manufacturer |
|---|---|---|---|
| 1 | | Black | |
| | a | Drimaren Black K3B, Reactive Black 5, 20505 | Clariant |
| | b | Drimaren Black PBL, Reactive Black 8 | Clariant |
| | c | Drimaren Black R2BL, Reactive Black 34 | Clariant |
| | d | Nigrosin Black, Acid Black 2, 50420 | Fluka |
| | e | Duasyn Direct Black H Direct Black 171 | Hoechst |
| | f | Cartasol Black MG, Basic Black 11 | Clariant |
| | g | Lanasysn Black S-DL, Acid Black 194 (Azo Chromium Complex) | Clariant |
| 2 | | Blue | |
| | a | Drimaren Turquoise X-B, Reactive Blue 41 | Clariant |
| | b | Drimaren Turquoise PCO, Reactive Blue 207 | Clariant |
| | c | Duasyn Direct Turquoise Blue FBL, Direct Blue 199, 74190 | Hoechst |
| | d | Duasyn Direct Blue GRL, Direct Blue 214, 23158 | Hoechst |
| | e | Carta Turquoise GL Direct Blue 86, 74180 | Clariant |
| | f | Sadolan Violet E2R, Acid Violet 126 | Clariant |
| | g | Cartasol Turquoise RF | Clariant |
| 3 | | Red | |
| | a | Procion Red MX-5B Reactive Red 2, 18200 | ICI |
| | b | Remazol Red 3B, Reactive Red 23, 16202 | Hoechst |
| | c | Drimaren Brillant Red PB, Reactive Red 187 | Clariant |
| | d | Drimaren Brillant Red X2-B, Reactive Red 56 | Clariant |
| | e | Drimaren Brillant Red K4BL, Reactive Red 147 | Clariant |
| | f | Cartasol Red 2GF, Direct Red 239 | Clariant |
| | g | Cartasol Brillant Orange 2RF, Direct Orange 118 | Clariant |
| | h | Duasyn Direct Red 8B, Direct Red 81, 28160 | Hoechst |
| | i | Indusol Rubinol SF, Direct Red 261 | Clariant |
| | j | Solar Rubinol 3LR, Direct Violet 47, 25410 | Clariant |
| | k | Solar Brillant Red BA, Direct Red 180, 35780 | Clariant |
| | l | Duasyn Acid Ponceau 4RC Acid Red 18, 16255 | Hoechst |
| | m | Basacid Red 316, Acid Red 87, 45380 | BASF |
| | n | Sandolan Rubinol E3 GPL, Acid Red 57, 17053 | Clariant |
| | o | Sandolan Brillant Red N-BG, Acid Red 249, 18134 | Clariant |
| | p | Morfast Red 101, Solvent Red 68 | Morton |
| | q | Remazol Brillant Red F3B, Reactive Red 180 | Hoechst |
| | r | Drimaren Red X6-BN, Reactive Red 243 | Clariant |
| 4 | | Yellow | |
| | a | Remazol Brillant Yellow GL, Reactive Yellow 37 | Hoechst |
| | b | Remazol Yellow GR, Reactive Yellow 15 | Hoechst |
| | c | Remazol Brillant Yellow 4GL, | Hoechst |

TABLE 1-continued

| No. | Denomination of the Dye | Manufacturer |
|---|---|---|
| | Reactive Yellow 160 | |
| d | Procion Yellow MX 3R, Reactive Orange 86 | ICI |
| e | Procion Yellow MX 8G, Reactive Yellow 86 | ICI |
| f | Duasyn Acid Yellow XX, Acid Yellow 23, 19140 | Hoechst |
| g | Duasyn Direct Yellow 6G, Direct Yellow 157, 13965 | Hoechst |
| h | Cartasol Yellow 5GF, Direct Yellow 148:1, (Azo) | Clariant |
| 5 | Green | |
| a | Duasyn Acid Green Acid Green 16, 44025 | Hoechst |
| b | Drimaren Brillant Green X-6BL, Reactive Green 12 | Clariant |

The above-mentioned dyes are particularly proved since they do not precipitate, as desired in accordance with the invention, from the aqueous colouring agent solutions during storage over an extended period of time and result, after application onto a writing or printing medium as, for example, paper into an intensive, rapidly drying colour print which is essentially insoluble in water.

From the above table 1, there are mentioned the following exemplary dyes which are particularly preferred in accordance with the invention: Lanasyn Black S-DL (Acid Black 194; Azo Chromium Complex), Cartasol Turquoise RF; Drimaren Red X6-BN (Reactive Red 243) and Cartasol Yellow 5GF (Direct Yellow 148:1; Azo dye). These dyes form aqueous solutions with the precursor of the first auxiliary substance and optionally also with the second auxiliary substance and optionally also with further additives which are particularly stable over an extended period of time, may be used for writing and printing and result into a clear, rapidly drying image of letters or figures having a high fastness to water already after a short time.

One or more than one of the dyes are present in the colouring agents, and particularly preferred in amounts in the range of from 0.1 to 20 parts by weight, even more preferred in amounts in the range of from 1 to 10 parts by weight and most preferred in amounts in the range of from 3 to 8 parts by weight, based on a solid dye, for example a powdered dye.

It is another, albeit preferred embodiment of the invention that the second auxiliary substance dissolved in water is an alkaline substance. Alkaline substances are defined to have a very low acid strength (and hence, have a comparatively high $pK_a$ value). As substances used with additives compensating the alkalinity of the colouring agent according to the invention, such alkaline substances have the advantage to keep the water-soluble dye having anionic groups in solution in the water phase before the application of said colouring agent onto the medium or the support, respectively, i.e. during the time of storing and transporting said colouring agent.

Particularly preferred alkaline substances are ammonia and amines, preferably diamines. A particularly advantageous diamine which may be preferably used is ethylene diamine. Aqueous solutions of the colouring agent of the invention containing ethylene diamine do not result into a precipitation of the water-soluble dye having anionic groups even under unfavorable conditions of storage over extended time periods. Effective as alkaline substances are also amine derivatives like alkanol amines, for example ethanol amine.

To give just one example: a precipitation of the water-soluble dye Cartasol Yellow 5GF (C.I. Direct Yellow 148:1) is prevented even during storage over an extended time, and a highly water-resistant printing ink is obtained, if ethanol amine as the alkaline substance (and as the second auxiliary substance) is used. In accordance with the invention, there may be used one single second auxiliary substance or more than one second auxiliary substance may be used in combination.

The second auxiliary substance or the second auxiliary substances is/are present in the colouring agents according to the invention in amounts in the range of from 0.1 to 10 parts by weight, more preferred in amounts in the range of from 1 to 5 parts by weight.

Another preferred embodiment of the invention is directed to an embodiment wherein the precursor of the first auxiliary substance is dissolved in the colouring agent. This means that the precursor of the substance having a low $pK_a$ value is contained in the aqueous phase.

It is an alternative, albeit preferred embodiment of the invention which may be advantageously used in specific fields of application that the colouring agent does not contain the precursor of the first auxiliary substance in the aqueous phase; rather, said precursor is present in or on the medium onto which the colouring agent composition comprising the water, the dye and optionally the second auxiliary substance, is applied so that the colouring agent also containing the precursor of the first auxiliary substance is formed in or on said medium. This embodiment has a specific advantage in that a stable colouring agent solution, optionally having a content of said second auxiliary substance, may be stored over an extended time and that the colouring agent composition containing said precursor of the first auxiliary substance is formed only when using said colouring agent for writing or printing, respectively.

Such colouring agents are, in accordance with the invention, particularly preferred wherein the precursor of the first auxiliary substance is a compound lowering the pH value of the colouring agent when being contacted to air. Without desiring to be bound by a theoretical explanation, it is at present assumed that the air has a double effect in the present case: on the one hand, the oxygen of the air is required for a conversion of the precursor of the first auxiliary substance into said first auxiliary substance. On the other hand, the water (optionally further solvents as well) are taken away by the air, whereby a step of drying the colouring agent is effected.

The above-mentioned decrease of the pH value of the colouring agent is preferably effected by a compound having a low $pK_a$ value. As a consequence, the precursor of the first auxiliary substance is preferably a compound releasing a compound having a low $pK_a$ value if in contact with air. Without restricting the invention thereby, the precursor of the first auxiliary substance is exemplified by a compound releasing an acid if contacted with air. It is, in accordance with the invention, of particular advantage, to employ aldehydes as precursors of the first auxiliary substance. Examples of aldehydes are formaldehyde, acetaldehyde, paraldehyde, glyoxal, glyoxylic acid, glutaraldehyde and benzaldehyde. The above-mentioned precursors of the first auxiliary substance may easily be reacted to acids in air, for example to formic acid, acetic acid, glutaric acid or benzoic acid.

In accordance with the invention, precursors of inorganic acids may also be used as precursors of the first auxiliary substance, for example sulfites or phosphites. These compounds are also reacted to acids in air and, hence, may serve as the first auxiliary substance, i.e. may lower the pH value of the colouring agent.

It is another embodiment of the invention that the precursor of the first auxiliary substance is a combination of an acid with a volatile alkaline substance. In the case that the colouring agent according to the invention contains a combination of an acid with a volatile alkaline substance as the precursor of the first auxiliary substance, said volatile alkalne substance may be evaporated to the air after application of the colouring agent onto the medium, for example by printing or writing. Thereby, the acid in the colouring agent is released. Said acid, i.e. the first auxiliary substance as such, has a $pK_a$ value C in accordance with the invention which is connected to the $pK_a$ value A of the salt-forming groups of said water-soluble dye preferably by the above relation A>C.

Particularly preferred as the precursor of the first auxiliary substance is a combination of salicylic acid and ammonia, of benzoic acid or one of its derivatives, respectively, and ammonia, of adipic acid and ammonia or of lactic acid and ammonia. Instead of the ammonia, suitable volatile amines may also be used. As can easily be recognized, the ammonia or the amine, respectively, is evaporated from the aqueous colouring agent as soon as said agent is exposed to the air, and the corresponding acid is released. It is particularly advantageous to use, in the colouring agents according to the invention, a combination of salicylic acid and ammonia, or a combination of adipic acid and ammonia. These combinations contribute to preventing a precipitation of the dye during storage and to generating a highly water-resistant print after the application of said colouring agent onto a printing medium.

The precursor of the first auxiliary substance (or more than one precursors of the first auxiliary substance) is/are present in said colouring agents of the invention preferably in amounts ranging from 1 to 25 parts by weight, more preferred in amounts ranging from 5 to 15 parts by weight.

The colouring agents may contain further additives, in addition to the above-mentioned components. By adding such additives, it is possible to take into account specific facts in connection to the application of the colouring agent onto a medium and to the subsequent drying step, on the one hand, or to the stabilization of the colouring agent before its application, on the other hand.

Examples of such additives are organic solvents, oxidants, binders, stabilizers etc., without being restricted to such additives.

Particularly preferred is a colouring agent containing the above components which agent additionally contains an organic solvent which, even more preferred, has a boiling point >100° C. Examples for such solvents are alcohols, particularly preferred glycols. Colouring agents containing such organic solvents are advantageous in not drying in. Hence, they may be employed in manual or mechanic writing or printing devices if these devices are exposed to the air for a longer time without being capped.

In accordance with another preferred embodiment of the invention, the colouring agent additionally contains an oxidant. Examples for such oxidants are perchlorates, particularly preferred water-soluble perchlorates. Surprisingly, it was found that the transformation of the precursor of the first auxiliary substance into the first auxiliary substance itself is possible with such oxidants even if the oxidant is used in low amounts, even in almost catalytical amounts.

In accordance with a further preferred embodiment of the invention, the colouring agent additionally contains a binder, preferably a binder which is soluble in water only in the alkaline pH range. Such binders are, for example, rosins or derivatives thereof. The advantage of a use of such a binder is that it is dissolvable in the colouring agent to be stored or transported, respectively, but will become insoluble after acidification of the colouring agent subsequent to the transformation of the precursor of the first auxiliary substance into the first auxiliary substance, whereby the pH value of the colouring agent is lowered. Thereby, the object of the invention to provide a substantially water-insoluble colouring agent can be achieved in a particularly smart way.

Also preferred are colouring agents according to the invention which contain suitable stabilizers. As a stabilizer, tris-(hydroxymethyl-)aminomethane ("Tris") may be mentioned. Colouring agents containing "Tris" exhibit in several embodiments of the invention a particularly high stability during storage and provide an excellently water-resistant print. The amount of "Tris" in the colouring agents according to the invention may advantageously be within a range of from 0.1 to 3 parts by weight, particularly preferred within a range of from 1.0 to 2.0 parts by weight.

The colouring agents according to the invention are prepared in the course of per se known processes, for example by mixing water, one or more than one water-soluble dye(s) having anionic groups exhibiting a $pK_a$ value substantially not exceeding A, optionally the precursor of the first auxiliary substance exhibiting as such a $pK_a$ value of C, optionally one or more than one second auxiliary substance(s) having a $pK_a$ value of B which is/are dissolved in the water and optionally also further additives and additional substances.

This step might be optionally be carried out at an elevated temperature.

Particularly good results are achieved by a process for preparing the colouring agent according to the invention which process is characterized by the specific order of the steps of adding the above-referenced components. In the course of this manufacturing process which is preferred due to the good results achieved, colouring agent compositions are obtained the dye of which or the colouring agent components of which do not precipitate even under unfavorable conditions over extended storage periods and which, moreover, provide a written or printed image, respectively, which can be dried rapidly and which is highly water-resistant.

The process is characterized by a step of feeding water first, dissolving therein said water-soluble dye, optionally together with the second auxiliary substance(s) and/or one or more than one additive(s) and a subsequent step of adding the precursor of the first auxiliary substance.

In the case referred above that the colouring agent according to the invention does not contain the precursor of the first auxiliary substance in the aqueous phase and said precursor is provided in or on the printing medium on which the colouring agent composition comprising the water, the dye and optionally the second auxiliary substance is applied, the process for preparing the colouring agent according to the invention consists of the steps of supplying water first and dissolving therein the water-soluble dye, optionally together with the second auxiliary substance(s) and/or one or more additive(s) therein. The step of combining the colouring agent with the precursor of the first auxiliary substance is then conducted on the printing medium onto which the colouring agent composition is applied.

Preferably, the components are combined by agitating the water supplied first, for example by stirring the solution. The step of stirring may be conducted by means of a mechanical stirrer, by agitating the solution with a jet stream or in any other per se known way. It is a preferred embodiment that the water is heated before the addition of the water-soluble dye and of the other components, respectively, for example heated to a temperature in the range of from 20 to 60° C.

A particular example for the preparation of the colouring agent composition according to the invention consists of the steps of heating the water to a temperature of 50° C. and adding the water-soluble dye with stirring, together with an alkaline substance as, for example, ethylene diamine and a stabilizer as, for example, tris-(hydroxymethyl-) aminomethane to the water in a heated condition. Subsequently, the precursor of the first auxiliary substance is added, for example ammonia together with salicylic acid.

The colouring agent as described above is used in the course of the printing process or writing process according to the invention by applying said colouring agent onto a medium. The application onto said medium is, for example, conducted by means of per se known printing devices or writing devices which contain the colouring agent according to the invention or to which the colouring agent is fed in a manner known to a skilled person, for example by suitable conduits. The colouring agents according to one or more than one of the embodiments described above in detail are best suitable for the processes according to the invention, since the colouring agents can not only be stored under stable conditions before their use without any precipitation of the dye or other components of the colouring agent but may also rapidly be dried after the application so as to obtain substantially water-insoluble signs, lines, areas etc. on the printing medium.

In said printing process according to the invention, there is preferably used a colouring agent containing at least the essential components water and one or more water-soluble dye(s) having anionic groups in combination with the precursor of the first auxiliary substance, and optionally additionally also one or more than one of said second auxiliary substance(s) dissolved in the water.

Another preferred embodiment of the invention is, however, a printing process or writing process wherein a medium is used which contains applied to its surface or incorporated into the medium the first auxiliary substance or a precursor thereof.

In the printing or writing processes according to the invention, there may be used carriers as the medium which have a distinct chemical structure or physical character of their surface. The particularly preferred medium is paper; there may, however, be used other media, too, which, in most cases, are sheet-like materials; this is, however, not compulsory. Examples for other media are media made of plastics (as, for example, plastic films) or media coated with plastics. The use of media made of wood, metals, ceramics, textile materials, leather etc. is also possible.

By using the colouring agents of the present invention, there are obtained substantially water-insoluble dyes, as soon as the precursor of the first auxiliary substance was transferred into the first auxiliary substance in the course of a physical and/or chemical reaction, and the first auxiliary substance lowers the pH value of the colouring agent. While the water is evaporated, a water-insoluble dye is obtained. The above-referenced additives and additional substances contribute to said chemical and physical reactions in an optimum manner.

The invention is in more detail explained below while referring to working examples. The invention is, however, not restricted to these working examples. There are given examples for colouring agents or inks, respectively, which have been proven best suited in practice. All indications of numbers are parts based on the weight (parts by weight). The colouring agents or inks, respectively, are stable over a long time when stored under controlled access of air, i.e. in closed containers. Their flow characteristics are excellent, and the colouring agents can rapidly be dried. After drying, i.e. already a few minutes to hours after their application onto the medium, the coloured images are completely fast to water and water-resistant. This is particularly true for such inks containing a binder component. Such a binder component additionally improves the adhesion of the colouring agent or the ink, respectively, to a medium as, for example, paper.

EXAMPLE 1

Preparation of a Colouring Agent in the Form of an Ink 140 parts by weights of water were heated to 50° C. in a glass beaker provided with a magnetic stirring rod and standing on the heating plate of a mechanical stirrer. The following components were successively added to the water: 10 parts by weight of ethanol amine, 7 parts by weight of Duasyn Direct Turquoise Blue FBL (C.I. Direct Blue 199, C.I. 74190, manufactured by Hoechst AG) in the form of a powder as well as 1.5 parts by weight Tris in small amounts. The suspension was stirred until all components were completely dissolved in the water. The clear, dark turquoise blue solution was then added with 32 parts by weight of ammonium hydroxide (25% in water). Thereafter, 5 parts by weight adipic acid were added with stirring.

The solution was completely clear. There were not noted solid precipitations neither when observing the solution through a layer of 5 cm thickness nor when filtering it.

The fastness to water was tested in such a manner that a drop of water was dripped onto a completely dry sign printed with said colouring agent composition by means of an ink jet printer. The fastness to water was evaluated to be "excellent" if no visible ring of colouring agent diluted with water was formed around the printing ink sign. The evaluation was "good" if only a poorly visible ring of colouring agent diluted with water was formed around the printing ink sign. In the present case, the fastness to water was evaluated to be good.

Further recipes of colouring agent compositions according to the invention are given in the following examples 2 to 5 as well as in example 6 (including table 2).

EXAMPLE 2

Phthalocyanine dye, C.I. Direct Blue 199

| Recipe (parts by weight): | 70 water |
| --- | --- |
| | 3 ethylene diamine |
| | 5 Direct Blue 199 |
| | 10 ammonium hydroxide (25% in water) |
| | 4 glutaraldehyde |
| | 2 glutaric acid anhydride |
| | 5 salicylic acid |

The chemical formula of the C.I. Direct Blue 199 dye is the following one

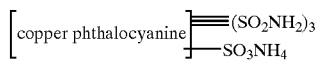

EXAMPLE 3

Trisazo dye C.I. Direct Red 80

| Recipe (parts by weight): | 70 water |
| --- | --- |
| | 5 Direct Red 80 |
| | 3 ethylene diamine |
| | 10 ammonium hydroxide (25% in water) |
| | 4 glutaraldehyde |
| | 5 salicylic acid |

The chemical formula of the C.I. Direct Red 80 dye is the following one:

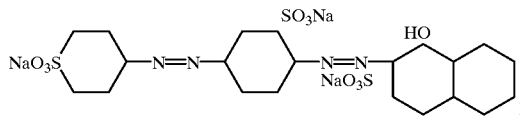

EXAMPLE 4

Water-soluble nigrosine dye, C.I. Acid Black 2

| Recipe (parts by weight): | 70 water |
| --- | --- |
| | 10 Acid Black 2 |
| | 3 ethylene diamine |
| | 10 ammonium hydroxide (25% in water) |
| | 5 glutaraldehyde |
| | 2 glutaric acid anhydride |
| | 5 salicylic acid |

C.I. Acid Black 2 dye is prepared by sulfonating nigrosine and converting the resulting product into the sodium salt; reference is made to Wolff, Ken. News, 39 (1879).

EXAMPLE 5

Eosin dye, C.I. Acid Red 87

| Recipe (parts by weight): | 70 water |
| --- | --- |
| | 4 Acid Red 87 |
| | 3 ethylene diamine |
| | 10 ammonium hydroxide (25% in water) |
| | 5 glutaraldehyde |
| | 5 salicylic acid |

The chemical formula of eosin is the following:

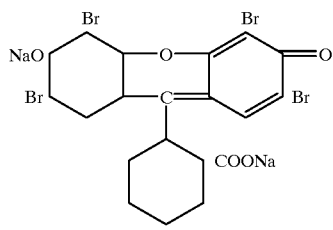

EXAMPLE 6

Further recipes of colouring agent compositions according to the invention are given in the following table 2. Table 2 also indicates the results of test for storing stability and fastness to water.

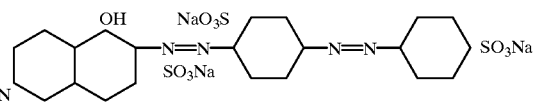

TABLE 2

| Number of the Dye (according to Table 1) | Concentration (Parts by Weight) | First Auxiliary Substance | Concentration (Parts by Weight) | Second Auxiliary Substance | Concentration (Parts by Weight) | Optional Further Additives | Storage Stability | Fastness to Water |
|---|---|---|---|---|---|---|---|---|
| 1g | 6 | lactic acid + glyoxal | 3 2 | ethylene diamine + ammonia | 2 3 | — | umlimited | good |
| 2g | 3 | adipic acid | 3 | ethylen diamine + ammonia | 3 2 | Tris | unlimited | excellent |
| 3r | 4 | salicylic acid | 3 | ethylene diamine + ammonia | 1 4 | Tris | unlimited | good |
| 4h | 3 | adipic acid | 1 | ethanol amine | 3 | — | unlimited | good |

What is claimed is:

1. A coloring agent for printing or writing, comprising:
water;
a water-soluble dye having anionic groups, said anionic groups having a $pK_a$ value substantially not exceeding A; and
a precursor of a first auxiliary substance, wherein said first auxiliary substance as such has a $pK_a$ value of C, wherein the relation A>C applies; and
wherein the precursor of the first auxiliary substance is a compound having the property of releasing said first auxiliary substance in the form of an acid when contacted with air under printing or writing conditions.

2. The coloring agent according to claim 1, wherein the precursor of the first auxiliary substance is an aldehyde.

3. The coloring agent according to claim 2, wherein the aldehyde is selected from the group consisting of formaldehyde, acetaldehyde, paraldehyde, glyoxal, glyoxylic acid, glutaraldehyde and benzaldehyde.

4. The coloring agent according to claim 1, wherein the precursor of the first auxiliary substance is a sulfite or phosphite.

5. The coloring agent according to claim 1, wherein the precursor of the first auxiliary substance is a combination of an acid with a volatile alkaline substance.

6. The coloring agent according to claim 5, wherein the combination of an acid with a volatile alkaline substance is selected from the group consisting of a combination of ammonia or of a volatile amine with an acid selected from the group consisting of salicylic acid, benzoic acid, adipic acid and lactic acid.

7. The coloring agent according to claim 6, wherein the combination of an acid with a volatile alkaline substance is the combination of ammonia with adipic acid.

8. The coloring agent according to claim 5, wherein the combination of an acid with a volatile alkaline substance is selected from the group consisting of salicylic acid and ammonia, benzoic acid and a derivative thereof and ammonia, adipic acid and ammonia and lactic acid and ammonia.

9. The coloring agent according to claim 1, further comprising one or more than one second auxiliary substance(s) having a $pK_a$ value of B, which second auxiliary substance(s) is/are dissolved in said water and wherein the relation of B>A>C applies.

10. The coloring agent according to claim 9, wherein said second auxiliary substance dissolved in said water is an alkaline substance.

11. The coloring agent according to claim 10, wherein the alkaline substance comprises ammonia or an amine or an alkanol amine.

12. The coloring agent according to claim 1, wherein said precursor of the first auxiliary substance is dissolved in the water of said coloring agent.

13. The coloring agent according to claim 1, wherein said precursor of the first auxiliary substance is present in or on the medium onto which the coloring agent composition comprising said water, said dye and optionally said second auxiliary substance is applied.

14. The coloring agent according to claim 1, wherein the precursor of the first auxiliary substance comprises a combination of said acid with a volatile alkaline substance.

15. The coloring agent according to claim 1 in the form of an ink.

16. The coloring agent according to claim 1 in the form of a printing ink.

17. A printing process comprising applying a coloring agent by means of a printing device onto a medium, wherein one or more than one coloring agent according to claim 1 is/are used as the coloring agent.

18. A writing process comprising applying a coloring agent by means of a writing device onto a medium, wherein one ore more than one coloring agent according to claim 1 is/are used as the coloring agent.

19. A process for preparing the coloring agent according to claim 1, said process comprising the steps of
(a) supplying water first;
(b) dissolving therein said water-soluble dye; and
(c) subsequently adding said precursor of said first auxiliary substance to the solution obtained in step (b).

20. A process for preparing the coloring agent according to claim 1, said process comprising the steps of
(a) supplying water first;
(b) dissolving therein said water-soluble dye; and
(c) subsequently contacting said precursor of the first auxiliary substance with the solution obtained in step (b).

21. The process according to claim 19, wherein one or more than one second auxiliary substance(s) is/are included in the dissolving step (b).

22. The process according to claim 19, wherein one or more than one further additive(s) is/are included in the dissolving step (b).

23. The coloring agent of claim 11, wherein said amine is a diamine and said alkanol amine is ethanol amine.

24. A process comprising applying by printing or writing on a medium for printing or writing a coloring agent comprising water and a water-soluble dye having anionic groups, said anionic groups having a $pK_a$ value substantially not exceeding A; wherein the medium has applied on its surface or incorporated into the medium a first auxiliary substance or a precursor thereof, wherein said first auxiliary substance as such has a $pK_a$ value of C, wherein the relation A>C applies; and wherein the precursor of the first auxiliary substance is a compound having the property of releasing said first auxiliary substance in the form of an acid when contacted with air under printing or writing conditions.

* * * * *